United States Patent
Rimini et al.

(10) Patent No.: US 11,579,247 B2
(45) Date of Patent: Feb. 14, 2023

(54) SELF-BEATING SCHEME FOR FMCW-BASED PROXIMITY DETECTOR FOR 5G MMW DEVICES

(71) Applicant: QUALCOMM Incorporated, San Diego, CA (US)

(72) Inventors: Roberto Rimini, San Diego, CA (US); Nan Zhang, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 565 days.

(21) Appl. No.: 16/559,175

(22) Filed: Sep. 3, 2019

(65) Prior Publication Data

US 2020/0081093 A1 Mar. 12, 2020

Related U.S. Application Data

(60) Provisional application No. 62/727,856, filed on Sep. 6, 2018.

(51) Int. Cl.
*G01S 7/40* (2006.01)
*G06F 3/01* (2006.01)
*H04W 64/00* (2009.01)
*G06F 3/044* (2006.01)

(52) U.S. Cl.
CPC ............ *G01S 7/4056* (2013.01); *G06F 3/017* (2013.01); *G06F 3/044* (2013.01); *H04W 64/006* (2013.01)

(58) Field of Classification Search
CPC combination set(s) only.
See application file for complete search history.

(56) References Cited

U.S. PATENT DOCUMENTS

| | | | |
|---|---|---|---|
| 8,866,667 B2 * | 10/2014 | Vacanti | G01S 13/882 342/120 |
| 2005/0181732 A1 | 8/2005 | Kang et al. | |
| 2012/0112872 A1 * | 5/2012 | Kang | H01C 7/108 338/21 |
| 2013/0210477 A1 | 8/2013 | Peter | |
| 2017/0038877 A1 * | 2/2017 | Kuboyama | G06F 1/163 |
| 2019/0353750 A1 * | 11/2019 | Rimini | H01Q 21/28 |
| 2020/0195289 A1 * | 6/2020 | Chang | H04W 52/18 |
| 2021/0211167 A1 * | 7/2021 | Ramasamy | H01Q 1/38 |
| 2022/0345180 A1 * | 10/2022 | Avasarala | H04B 7/0413 |

FOREIGN PATENT DOCUMENTS

| | | |
|---|---|---|
| EP | 2631666 A1 | 8/2013 |
| EP | 3079282 A1 | 10/2016 |

OTHER PUBLICATIONS

International Search Report and Written Opinion—PCT/US2019/049526—ISA/EPO—dated May 7, 2020.

* cited by examiner

*Primary Examiner* — Thanh C Le
(74) *Attorney, Agent, or Firm* — Qualcomm Incorporated (57) ABSTRACT

Aspects of the present disclosure provide a simplified solution for proximity detection of an object in a wireless communication that does not require complex hardware to maintain mutual coupling reference signal. Specifically, in accordance with aspects of the present disclosure, the received signal that may include the mutual coupling signal and target signal may be multiplied by itself to extract the delay information associated with the target signal. The techniques outlined here may provide a greater robustness to variations of mutual coupling induced by phone covers, for example, being added by the user.

20 Claims, 5 Drawing Sheets

SELF-BEATING SCHEME FOR FMCW-BASED PROXIMITY DETECTOR FOR 5G MMW DEVICES

CROSS-REFERENCE TO RELATED APPLICATION(S)

This application claims benefit of U.S. Provisional Application Ser. No. 62/727,856, entitled "SELF-BEATING SCHEME FOR FMCW-BASED PROXIMITY DETECTOR FOR 5G MMW DEVICES" and filed Sep. 6, 2018, which is expressly incorporated by reference herein in its entirety.

BACKGROUND

The present disclosure relates to wireless communication systems, and more particularly, to enabling a wireless transceiver to perform proximity detection to adjust transmission parameters for wireless communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

However, mobile networks are facing soaring demands for mobile data as consumers increasingly utilize mobile devices to share and consume high-definition multi-media. In addition, as the capabilities of mobile devices continue to grow with advancements such as higher-resolution cameras, 4K video, always-connected cloud computing, and virtual/augmented reality, so does the ever-increasing demand for faster and improved connectivity. Enhancing mobile broadband services is one of the driving forces behind a fifth generation (5G) wireless communications technology (which can be referred to as new radio (NR)) that is envisaged to expand and support diverse usage scenarios and applications with respect to current mobile network generations.

One aspect of the 5G NR communications technology includes the use of high-frequency spectrum bands above 24 GHz, which may be referred to as millimeter wave (mmW), that is emerging as a 5G technology. The use of these bands is compelling as the large bandwidths available at these high frequencies enable extremely high data rates and significant increases in capacity. There may be some limitations in the usage of mmW bands, such as lack of robustness for mobile broadband applications due to increased propagation loss and susceptibility to blockage (e.g., hand, head, body, foliage, buildings or other structures).

Generally, to compensate for the higher path loss, transmit power levels of the user equipment (UE) can be increased or beamforming can concentrate energy in a particular direction. However, the Federal Communications Commission (FCC) limits maximum permitted exposure (MPE) at such power levels. To meet targeted guidelines, devices are responsible for balancing performance with transmission power and other constraints. This balancing act can be challenging to achieve, especially with devices that have cost, size, and other considerations.

SUMMARY

Aspects of the present disclosure provide a simplified solution for proximity detection of an object in a wireless communication that does not require complex hardware to maintain mutual coupling reference signal. Specifically, in accordance with aspects of the present disclosure, the received signal that may include the mutual coupling signal and target signal may be multiplied by itself to extract the delay information associated with the target signal. The techniques outlined here may provide a greater robustness to variations of mutual coupling induced by phone covers, for example, being added by the user.

In one example, a method for wireless communication is described. The method comprises transmitting, via a first antenna of the UE, a proximity detection signal. The method may further comprise detecting, at a second antenna, a received signal, the received signal including a reflected proximity detection signal that is reflected by an object and a mutual coupling signal that leaked from the first antenna. The method may further comprise attenuating the mutual coupling signal from the received signal by multiplying the received signal by itself to identify the reflected proximity detection signal. The method may further comprise adjusting a transmission parameter based on the reflected proximity detection signal, wherein the transmission parameter varies according to a range to the object. The method may further comprise transmitting an uplink signal using the transmission parameter.

In another example, an apparatus for wireless communications is disclosed. The apparatus may include a memory configured to store instructions and a processor communicatively coupled with the processor. The processor may be configured to execute the instructions to transmit, via a first antenna of the UE, a proximity detection signal. The processor may further be configured to execute instructions to detect, at a second antenna, a received signal, the received signal including a reflected proximity detection signal that is reflected by an object and a mutual coupling signal that leaked from the first antenna. The processor may further be configured to execute instructions to attenuate the mutual coupling signal from the received signal by multiplying the received signal by itself to identify the reflected proximity detection signal. The processor may further be configured to execute instructions to adjust a transmission parameter based on the reflected proximity detection signal, wherein the transmission parameter varies according to a range to the object. The processor may further be configured to execute instructions to transmit an uplink signal using the transmission parameter.

In another example, a non-transitory computer readable medium storing instructions, executable by a processor, for wireless communications is disclosed. The non-transitory computer readable medium may include instructions for transmitting, via a first antenna of the UE, a proximity detection signal. The non-transitory computer readable medium may include instructions for detecting, at a second antenna, a received signal, the received signal including a reflected proximity detection signal that is reflected by an object and a mutual coupling signal that leaked from the first antenna. The non-transitory computer readable medium may include instructions for attenuating the mutual coupling signal from the received signal by multiplying the received signal by itself to identify the reflected proximity detection signal. The non-transitory computer readable medium may include instructions for adjusting a transmission parameter based on the reflected proximity detection signal, wherein the transmission parameter varies according to a range to the object. The non-transitory computer readable medium may include instructions for transmitting an uplink signal using the transmission parameter.

In another example, another apparatus for wireless communication is disclosed. The apparatus may include means for transmitting, via a first antenna of the UE, a proximity detection signal. The apparatus may further include means for detecting, at a second antenna, a received signal, the received signal including a reflected proximity detection signal that is reflected by an object and a mutual coupling signal that leaked from the first antenna. The apparatus may further include means for attenuating the mutual coupling signal from the received signal by multiplying the received signal by itself to identify the reflected proximity detection signal. The apparatus may further include means for adjusting a transmission parameter based on the reflected proximity detection signal, wherein the transmission parameter varies according to a range to the object. The apparatus may further include means for transmitting an uplink signal using the transmission parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

As discussed above, one aspect of the 5G NR communications technology includes the use of high-frequency spectrum bands above 24 GHz, which may be referred to as mmW. The use of these bands enable extremely high data rates and significant increases in data processing capacity. However, mmW bands are susceptible to rapid channel variations and suffer from severe free-space path loss and atmospheric absorption. In addition, mmW bands are highly vulnerable to blockage (e.g. hand, head, body, foliage, building penetration). Particularly, at mmW frequencies, even small variations in the environment, such as the turn of the head, movement of the hand, or a passing car, can change the channel conditions between the base station and the UE, and thus impact communication performance.

Current mmW 5G NR systems leverage the small wavelengths of mmW at the higher frequencies to make use of multiple input multiple output (MIMO) antenna arrays to create highly directional beams that focus transmitted radio frequency (RF) energy in order to attempt to overcome the propagation and path loss challenges in both the uplink and downlink links. Generally, a mobile device (e.g., UE) may use a high transmit power to compensate for path loss associated with mmW signals. Because many of the UEs are physically operated by a user (e.g., a user holding a mobile phone), the physical proximity presents opportunities for radiation to exceed a given guideline, such as a maximum permitted exposure (MPE) limit as determined by the Federal Communications Commission (FCC). Because of these issues, it is advantageous to enable devices to detect a proximity of the user.

Some proximity-detection techniques may use a dedicated sensor to detect the user, such as a camera, an infrared sensor, or a radar sensor. However, these sensors may be bulky and expensive. In other examples, techniques for range-based transmission parameter adjustment may use a wireless transceiver to perform both proximity detection and wireless communication. In such situations, the wireless transceiver can enable a frequency-modulated continuous wave signal or a multi-tone signal to be transmitted for proximity detection. By analyzing reflections from either of these signals, a range (e.g., distance or slant range) to an object and a material composition of the object can be determined. Based on these determinations, a transmission parameter that is used for wireless communication can be adjusted to enable the wireless transceiver to meet guidelines promulgated by the government or the wireless industry, such as a MPE limit as determined by the FCC. By actively measuring the range to an object, a surrounding environment can be continually monitored and the transmission parameter can be incrementally adjusted to account for movement by the object.

However, in the range-based transmission parameter adjustment that use a wireless transceiver to perform both proximity detection and wireless communication, the small separation distance between the radiating and receiving antenna elements may result in an unavoidable effect of transmitted energy leaking in the receiver element. This effect may be referred to as mutual coupling (MC) leakage or transmitter (Tx)-Receiver (Rx) leakage. Due to the proximity of the transmitter, the energy level associated to MC may be several order of magnitude higher than the energy associated to the reflector (e.g., target signal that reflects off the target such as hand). Such a disparity in the received energy level may complicate detection of the target signal that may be buried under the MC side lobes. One technique to address this problem may rely on storing the MC waveform as a reference signal and utilizing a filter to cancel the MC waveform from the received signal to produce the target signal. Such a static approach based on a characterization of the MC in an anechoic scenario, however, may not be reliable because the MC electromagnetic field pattern may change overtime due to changes in antenna impedance/load or if a user adds a phone cover to the user equipment (UE) after the MC reference waveform has been stored. Specifically, in such situations, by adding the phone cover, the MC electromagnetic field pattern may be altered such that the MC reference waveform may not be helpful to cancel the received signal.

Thus, in contrast to the frequency-modulated continuous-wave (FMCW) radar detector from conventional systems where the information associated to the target is extracted by multiplying a Tx chirp waveform with the received one, aspects of the present disclosure provide a simplified solution that does not require additional hardware. Specifically, in accordance with aspects of the present disclosure, the received signal that may include the MC and target signal may be multiplied by itself. As a result of the cross products, the target chirp may be multiplied by the MC chirp. Specifically, given that the MC signal is constant over time, the MC signal can be used as a reference to extract the delay information associated with the target signal.

Features of the present disclosure provide advantages over conventional systems because the proposed techniques rely on simplified hardware design that removes the need of using an analog mixer to perform multiplication/beating operation. Further, techniques outlined herein are more robust to variations of MC induced by phone covers, for example, being added by the user because in conventional systems the use case cannot be addressed by the MC characterization in the factory as the phone cover may be added by the end user after purchase.

Various aspects are now described in more detail with reference to the FIGS. 1-5. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
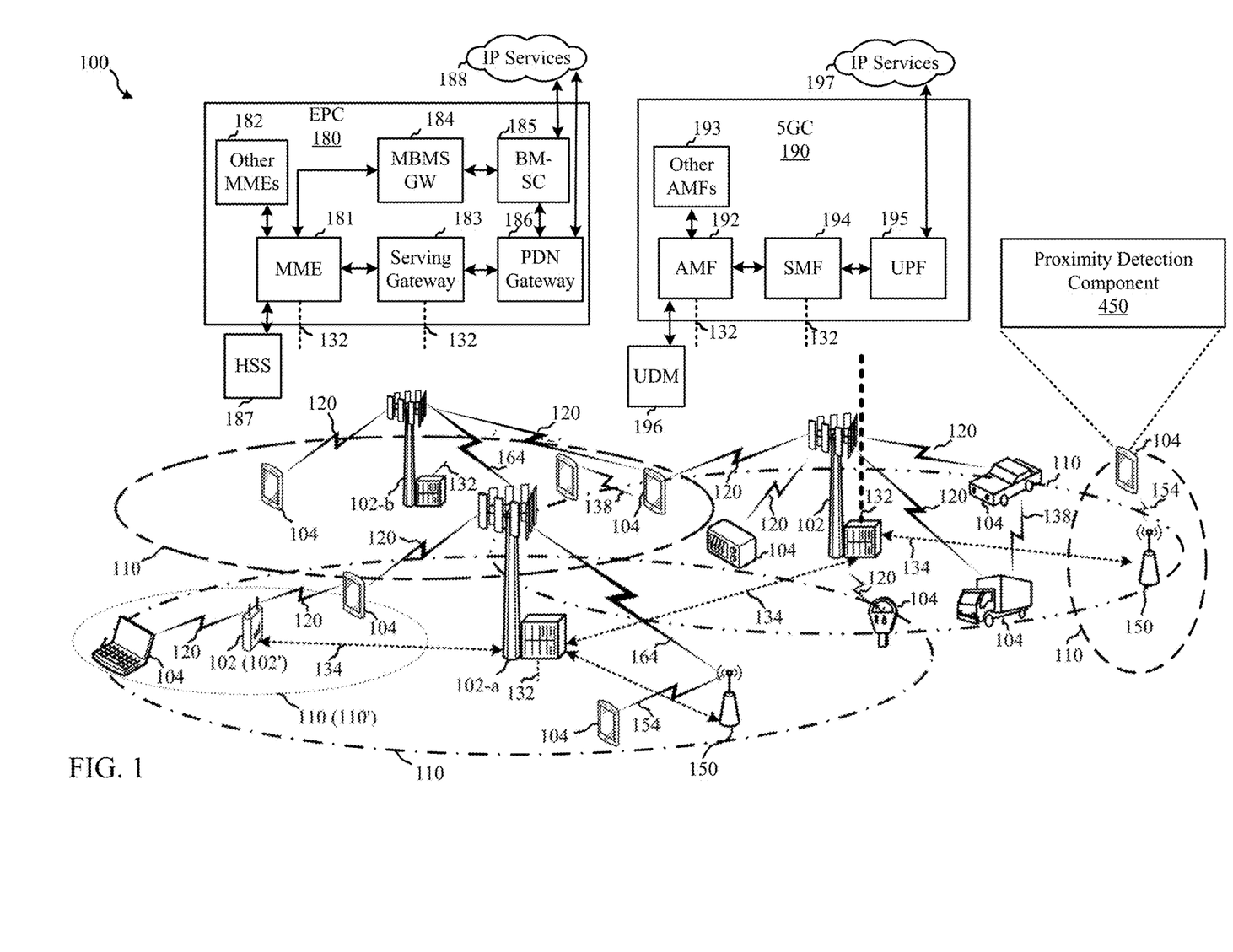
FIG. 1 is a schematic diagram of an example of a wireless communications system in accordance with aspects of the present disclosure.

FIG. 1 is a diagram illustrating an example of a wireless communications system 100 in accordance with aspects of the present disclosure. As discussed above, to provide range-based transmission parameter adjustment via a wireless transceiver, the UE 104 may include a proximity detection component 450 (see FIG. 4). The proximity detection component 450, in conjunction with the transceiver 402, may include circuitry and logic for transmitting and receiving signals via antennas. In some examples, some components within the wireless transceiver 402 and proximity detection component 450 can be utilized for both proximity detection and wireless communication. To this end, as discussed above, the received signal that may include the MC signal and target signal may be multiplied by itself in accordance with aspects of the present disclosure to leverage the constant characteristics of the MC signal.

The wireless communications system 100 may include one or more base stations 102, one or more UEs 104, and a core network, such as an Evolved Packet Core (EPC) 180 and/or a 5G core (5GC) 190. The one or more base stations 102 and/or UEs 104 may operate according to millimeter wave (mmW or mmWave) technology. For example, mmW technology includes transmissions in mmW frequencies and/or near mmW frequencies. Specifically, extremely high frequency (EHF) is part of the radio frequency (RF) in the electromagnetic spectrum where the EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave.

The EPC 180 and/or the 5GC 190 may provide user authentication, access authorization, tracking, internet protocol (IP) connectivity, and other access, routing, or mobility functions. The base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC 180 or the 5GC 190), with one another over backhaul links 132, 134 (e.g., Xn, X1, or X2 interfaces) which may be wired or wireless communication links.

The base stations 102 may wirelessly communicate with the UEs 104 via one or more base station antennas. Each of the base stations 102 may provide communication coverage for a respective geographic coverage area 110. In some examples, base stations 102 may be referred to as a base transceiver station, a radio base station, an access point, an access node, a radio transceiver, a NodeB, eNodeB (eNB), gNB, Home NodeB, a Home eNodeB, gNodeB (gNB), a relay, a transceiver function, a basic service set (BSS), an extended service set (ESS), a transmit reception point (TRP), or some other suitable terminology. The geographic coverage area 110 for a base station 102 may be divided into sectors or cells making up only a portion of the coverage area (not shown). The wireless communication network 100 may include base stations 102 of different types (e.g., macro base stations 102 or small cell base stations 180, described below).

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. The wireless communication network 100 may be a heterogeneous technology network in which different types of base stations provide coverage for various geographical regions. For example, each base station 102 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 104 with service subscriptions with the network provider. A small cell 150 may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 104 with service subscriptions with the network provider. A femto cell may also cover a small geographic area (e.g., a home) and may provide restricted access and/or unrestricted access by UEs 104 having an association with the femto cell (e.g., in the restricted access case, UEs 104 in a closed subscriber group (CSG) of the base station 102, which may include UEs 104 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 104 may be dispersed throughout the wireless communication network 100, and each UE 104 may be stationary or mobile. A UE 104 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 104 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 104 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a UE 104 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 104 may be able to communicate with various types of base stations 102 and network equipment including macro eNBs, small cell eNBs, macro gNBs, small cell gNBs, gNB, relay base stations, and the like.

UE 104 may be configured to establish one or more wireless communication links 120 with one or more base stations 102. The wireless communication links 120 shown in wireless communication network 100 may carry uplink (UL) transmissions from a UE 104 to a base station 102, or downlink (DL) transmissions, from a base station 102 to a UE 104. Each wireless communication link 120 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 120 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 120 may represent one or more broadcast channels.

In some aspects of the wireless communication network 100, base stations 102 or UEs 104 may include multiple antennas for employing antenna diversity schemes to improve communication quality and reliability between base stations 102 and UEs 104. Additionally or alternatively, base stations 102 or UEs 104 may employ multiple input multiple output (MIMO) techniques that may take advantage of multi-path environments to transmit multiple spatial layers carrying the same or different coded data.

Wireless communication network 100 may also support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 104 may be configured with multiple downlink CCs and one or more uplink CCs for carrier aggregation. Carrier aggregation may be used with both FDD and TDD component carriers. The communication links 120 may use multiple-input and multiple-output (MIMO) antenna technology, including spatial multiplexing, beamforming, and/or transmit diversity. The base stations 105 and/or UEs 110 may use spectrum up to Y MHz (e.g., 5, 10, 15, 20, 30, 50, 100, 200, 400, etc., MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 138. The D2D communication link 138 may use the DL/UL WWAN spectrum. The D2D communication link 138 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communication network 100 may further include base stations 102 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

In a non-limiting example, the EPC 180 may include a Mobility Management Entity (MME) 181, other MMEs 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
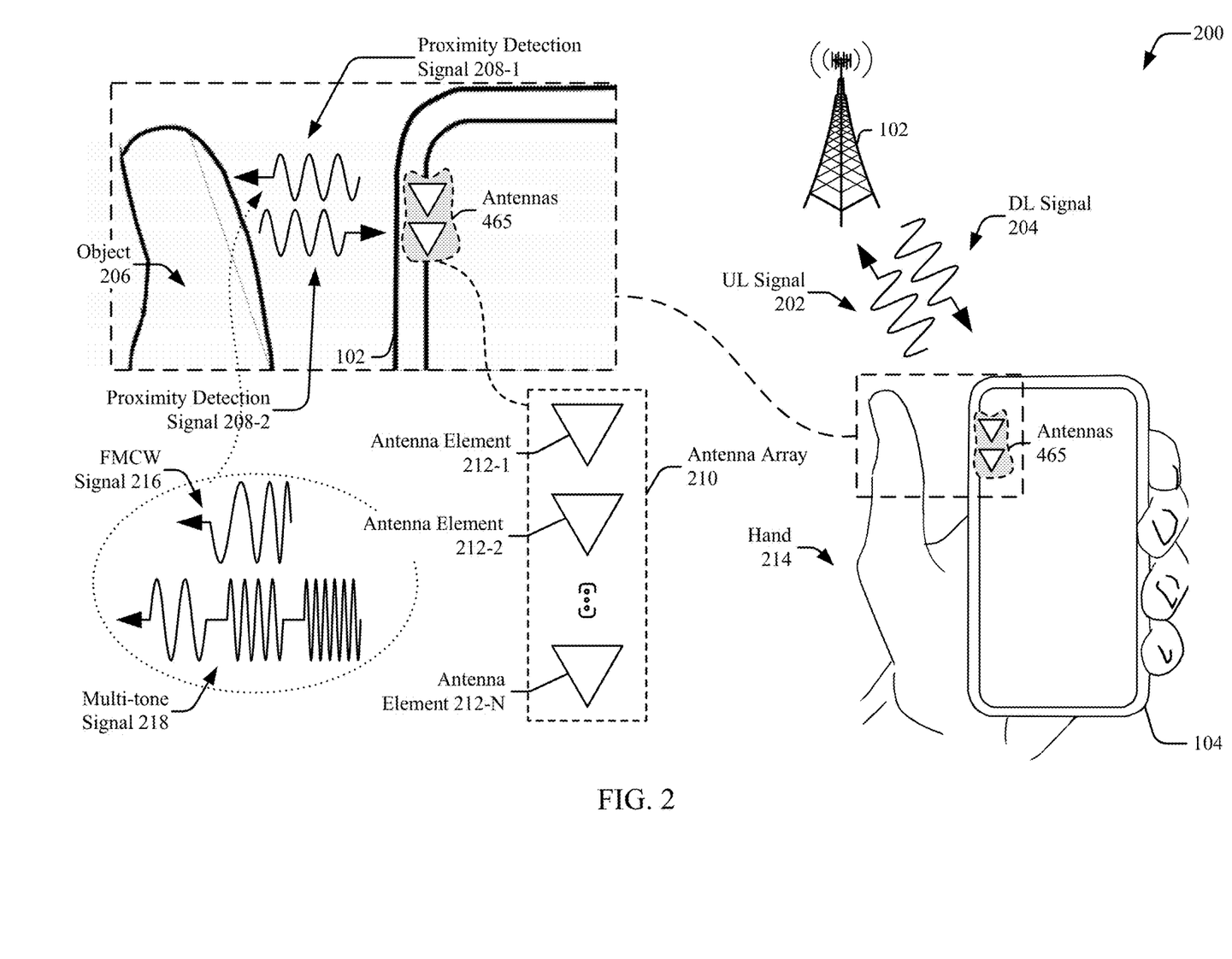
FIG. 2 illustrates an example operating environment for range-based transmission parameter adjustment.

FIG. 2 illustrates an example operating environment 200 for range-based transmission parameter adjustment. In the example environment 200, a hand 214 of a user holds the UE 104. In one aspect, the UE 104 may communicate with the base station 102 by transmitting an uplink signal 202 (UL signal 202) or receiving a downlink signal 204 (DL signal 204) via at least one of the antennas 465 (see FIG. 4). A user's thumb, however, may represent a proximate object 206 that may be exposed to radiation via the uplink signal 202. To determine a range to the object 206, the UE 104 may transmit a proximity detection signal 208-1 via at least one of the antennas 465 and receives a reflected proximity detection signal 208-2 via at least another one of the antennas 124.

In one implementation, the proximity detection signal 208-1 comprises a frequency-modulated continuous-wave (FMCW) signal 216. In general, a frequency of the FMCW signal 216 increases or decreases across a time interval. Different types of frequency modulations may be used, including linear frequency modulations (LFM) (e.g., chirp), sawtooth frequency modulations, triangular frequency modulations, and so forth. The FMCW signal 216 enables radar-based ranging techniques to be utilized to determine the range to the object 206. To achieve a finer range resolution (e.g., on the order of centimeters (cm)) for close-range applications, larger bandwidths can be utilized, such as 1 gigahertz (GHz), 4 GHz, 8 GHz, and so forth. For instance, the FMCW signal 216 can have a bandwidth of approximately 4 GHz and include frequencies between approximately 26 and 30 GHz. The finer range resolution improves range accuracy and enables multiple objects 206 to be distinguished in range. The FMCW signal 216 can provide an accurate range measurement for a variety of distances based on the bandwidth (e.g., between approximately 4 and 20 cm for a 4 GHz bandwidth). The FMCW signal 216 also enables a composition of the object 206 to be directly measured. As such, the composition of the object 206 can be determined without the use of complex circuitry or an extensive calibration process. An amount of time for performing proximity detection can also be relatively short using the FMCW signal 216, such as within approximately one microsecond.

In another implementation, the proximity detection signal 208 is a multi-tone signal 218, which includes at least three tones (e.g., frequencies). The multi-tone signal 218 can be generated using existing components within the wireless transceiver 120, which are also used to generate the uplink signal 202. For example, the multi-tone signal 218 can be generated using an existing phase lock loop (PLL), using Orthogonal Frequency-Division Multiplexing (OFDM), or using a multi-tone transmit signal generated at baseband via a digital signal generator. Depending on the technique used, an amount of time for performing proximity detection via the multi-tone signal 218 can be on the order of approximately one microsecond and 400 microseconds. Frequency separations between the tones can be on the order of megahertz (MHz) or GHz. A bandwidth of the multi-tone signal 218 can be, for example, approximately 800 MHz or 2 GHz. The range to the object 206 is determined by analyzing a change in phase across each of these tones. To improve range accuracy, larger bandwidths (e.g., separations between tones) or larger quantities of tones can be used. The multi-tone signal 218 can be used to measure ranges between approximately 0 and 7 cm. To determine the composition of the object 206, the multi-tone signal 218 can also be used to indirectly determine the reflection coefficient based on a calibration process.

In some UEs 104, the antennas 465 may comprise at least two different antennas, at least two antenna elements 212 of an antenna array 210, at least two antenna elements 212 associated with different antenna arrays 210, or any combination thereof. As shown in FIG. 2, the antennas 465 correspond to the antenna elements 212 within the antenna array 210, which can include multiple antenna elements 212-1 to 212-N, where N represents a positive integer. Using at least one of the antenna elements 212, the wireless transceiver of the UE 104 can transmit the proximity detection signal 208-1 while receiving the reflected proximity detection signal 208-2 using at least another one of the antenna elements 212. In other words, the wireless transceiver can receive the reflected proximity detection signal 208-2 via a first antenna element 212-1 during a portion of time that the proximity detection signal 208-1 is transmitted via a second antenna element 212 2. The antennas 124 and/or elements thereof may be implemented using any type of antenna, including patch antennas, dipole antennas, and so forth.

If the UE 104 includes multiple antennas 124 located on different sides of the UE 104 (e.g., a top, a bottom, or opposite sides), the described techniques enable the user to be detected with respect to each antenna 465. In this way, transmission parameters can be independently adjusted relative to the range of the object 206 with respect to each antenna 465. Such independent detection therefore enables the two or more of the antennas 465 to be configured for different purposes. For example, one of the antennas 465 can be configured for enhanced communication performance while another one of the antennas 465 is simultaneously configured to comply with FCC requirements. As described in further detail with respect to FIG. 3, some of the components of the wireless transceiver can be utilized for both wireless communication and proximity detection.

Figure 3:
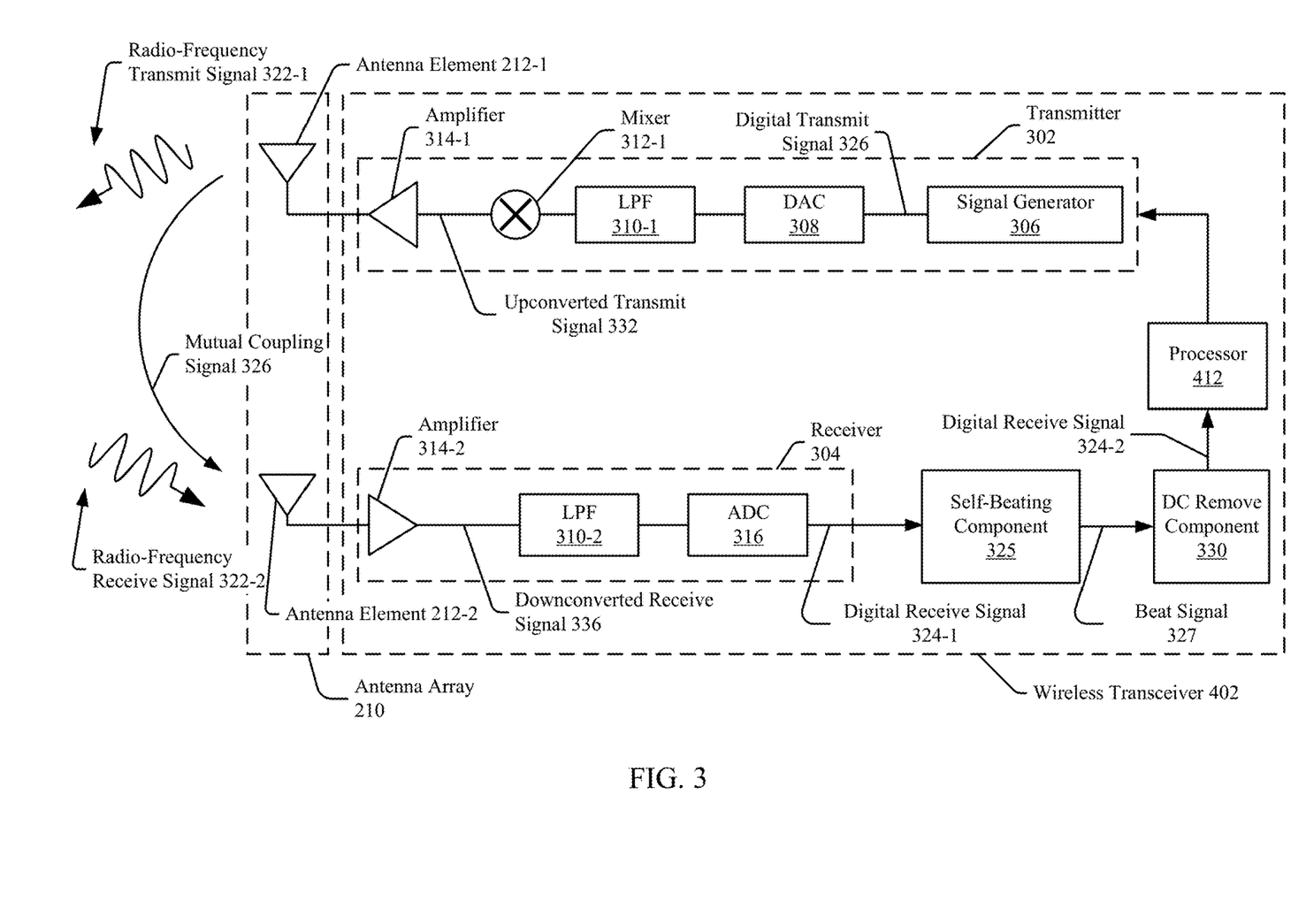
FIG. 3 illustrates an example diagram that implements range-based transmission parameter adjustment in accordance with aspects of the present disclosure.

FIG. 3 illustrates an example diagram 300 that implements range-based transmission parameter adjustment in accordance with aspects of the present disclosure. The wireless transceiver 402 includes a transmitter 302 and a receiver 304, which are respectively coupled between a processor 412 (see FIG. 4) and the antenna array 210. The transmitter 302 is shown to include a signal generator 306, a digital-to-analog converter (DAC) 308, a filter 310-1 (e.g., low-pass filter (LPF)), a mixer 312-1, and an amplifier 314-1. The receiver 304 is shown to include an amplifier 314-2 (such as a low-noise amplifier), a filter 310-2 (e.g., a LPF), and an analog-to-digital converter (ADC) 316. It should be appreciated that the transmitter 302 and the receiver 304 can also include other additional components that are not depicted in FIG. 3. These additional components can include band-pass filters, additional mixers, switches, and so forth.

Using these components, the transmitter 302 generates a digital transmit signal 326 in a digital domain. The digital transmit signal 326 can include a single frequency signal to generate the FMCW signal 216 (see FIG. 2) or multiple frequencies to generate the multi-tone signal 218 (see FIG. 2). In some examples, the upconverted transmit signal 332 may be used to produce a radio-frequency transmit signal 322-1.

The transmitter 302 transmits the radio-frequency transmit signal 322-1 via the antenna element 212-1 and the receiver 304 receives a radio-frequency receive signal 322-2 via the antenna element 212-2. The radio-frequency receive signal 322-2 can include a portion of the radio-frequency transmit signal 322-1 that is reflected by the object 206 (of FIG. 2). For proximity detection, the radio-frequency signals 322-1 and 322-2 can represent the proximity detection signals 208-1 and 208-2, respectively. For wireless communication, the radio-frequency signals 322-1 and 322-2 can represent the uplink signal 202 and the downlink signal 204, respectively.

However, as noted above, due to the small separation distance between the transmitting antenna element 212-1 and the receiving antenna element 212-a, an unavoidable effect of transmitted energy leaking (e.g., mutual coupling signal 326) in the receiver antenna element 212-2 may be observed. Specifically, because the antenna elements 212-1 and 212-2 are co-located as part of the same antenna array 210 or are otherwise proximate to one another, some of the radio-frequency transmit signal 322-1 can leak into the receiver 304 through the antenna element 212-2. This effect may be referred to as mutual coupling (MC) leakage 326 or Tx-Rx leakage. Due to the proximity of the transmitter 302, the energy level associated to mutual coupling signal 326 may be several order of magnitude higher than the energy of the radio-frequency receive signal 322-2 associated to the reflector (also referred to as "target signal"). Such a disparity in the received energy level may complicate detection of the radio-frequency receive signal 322-2 or target signal because the signal may be buried under the MC coupling signal 326 that is also observed at the receiving antenna element 212-2.

One technique to address this problem may rely on storing a reference signal of the MC waveform, as observed during the manufacturing of the UE 104, and utilizing a filter to cancel the mutual coupling signal 326 from the radio-frequency receive signal 322-2 to produce the target signal. Such static approach based on a characterization of the MC in anechoic scenario, however, may not be reliable because the MC electromagnetic field pattern may change overtime due to changes in antenna impedance/load or if a user adds a phone cover to the UE after the MC reference waveform has been stored.

Thus, aspects of the present disclosure provide techniques for separating the radio-frequency receive signal 322-2 from the mutual coupling signal 326 at the receiver 304 without the need to generate and store a reference MC signal, and subsequently utilize mutual coupling cancellation circuitry. Instead, as will be illustrated below, the received signal that may include a combination of mutual coupling signal 326 and the target signal 322-2 may be multiplied by itself to extract the delay information associated with the target signal.

To this end, the receiver 304 receives the radio-frequency receive signal 322-2 and generates a down converted receive signal 336, which is derived from the radio-frequency receive signal 322-2. As noted above, due to the cross-coupling between the antenna elements 212-1 and 212-2, the radio-frequency receive signal 322-2 also includes another portion of the radio-frequency transmit signal 322-1 (e.g., a mutual coupling component) that is not reflected by the object 206 in addition to some noise. This portion is shown by a mutual coupling signal 326. Thus, the down-converted receive signal 336 ($S_{Rx}(t)$) may be a combination of the received radio-frequency receive signal 322-2 (or target signal STRGT (t)), the mutual coupling signal 326 ($S_{MC}(t)$), and noise (n(t)), and expressed mathematically as follow:

$$s_{Rx}(t) = s_{TRGT}(t) + s_{MC}(t) + n(t) =$$ Equation 1

$$A_{MC} \cdot \exp\left(j2\pi\frac{K}{2}t^2\right) + \alpha_T \cdot h * \exp\left(j2\pi\frac{K}{2}(t - T_R)^2\right)$$

To remove the mutual coupling signal 326 from the down-converted receive signal 336 to produce the radio-frequency receive signal 322-2, aspects of the present disclosure incorporate a self-beating component 325. In some examples, the self-beating component 325 may take the down-converted receive signal 336 (either in analog or digital form—although FIG. 3 illustrates as digital receive signal 324-1 as one example), and multiply the down-converted receive signal 336 with the conjugate of the down-converted receive signal 336 to generate a beat signal ($S_{beat}(t)$) 327 that may be expressed as:

$$S_{beat}(t) = s_{Rx}(t) \cdot s_{Rx}^*(t) = \alpha_t^2 \cdot |h|^2 + A_{MC}^2 + 2\alpha_T A_{MC} \cdot \cos\varphi + 2\cos(2\pi K T_R)t$$ Equation 2

Although the above example illustrates the multiplying of the down-converted receive signal 336 with the conjugate of the down-converted receive signal 336 because the signal illustrated in FIG. 3 is a digital signal converted by ADC 316, it should be appreciated that the beat signal 327 may also be generated by multiplying the down-converted receive signal 336 by itself (or in other words squared). As noted above, it should be appreciated that the features of the present disclosure may be implemented for both digital and analog signals. In the event that received and/or the down-converted receive signal 336 is an analog signal, the mutual coupling signal may be attenuated by squaring the received signal via a non-linear device. This is because given that the mutual coupling signal 326 is constant over time (e.g., received at the antenna element 212-2 at a constant delay from the radio-frequency transmit signal 322-2 is transmitted from transmitting antenna element 212-1, the mutual coupling signal 326 can thus be used as a reference to extract the delay information associated with the target signal.

The beat signal 327 contains a real signal at frequency proportional to TR which is the target round-trip delay for the radio-frequency signal 322. Additional term in the beat-signal 327 represents DC terms from self-multiplication, and can be easily removed by the DC remove component 330 prior to ranging estimation by the processor 412.

The processor 412 obtains the receive signal 324-2 to perform proximity detection or wireless communication. For proximity detection, the processor 412 determines the range to the object 206 or the composition of the object 206 based on the digital receive signal 324-2. Based on this information, the processor 122 can generate a transmission parameter 328 that controls one or more transmission attributes for wireless communication. By specifying the transmission parameter, the processor 122 can, for example, cause the transmitter 302 to decrease power if an object 206 is near the computing device 102 or increase power if the object 206 is farther away from the computing device 102. If the composition of the object 206 is determined to not comprise human tissue, the processor 122 can, for example, keep the transmission parameter unchanged. The transmission parameter 328 can adjust a power level, a beam steering angle, a frequency, a selected antenna or antenna array, or a communication protocol that is used to transmit the uplink signal 202. The ability to determine the range to the object 206 or the composition of the object 206, and to control the transmitter 302 enables the processor 122 to balance performance of the computing device 102 with compliance or radiation requirements.

Figure 4:
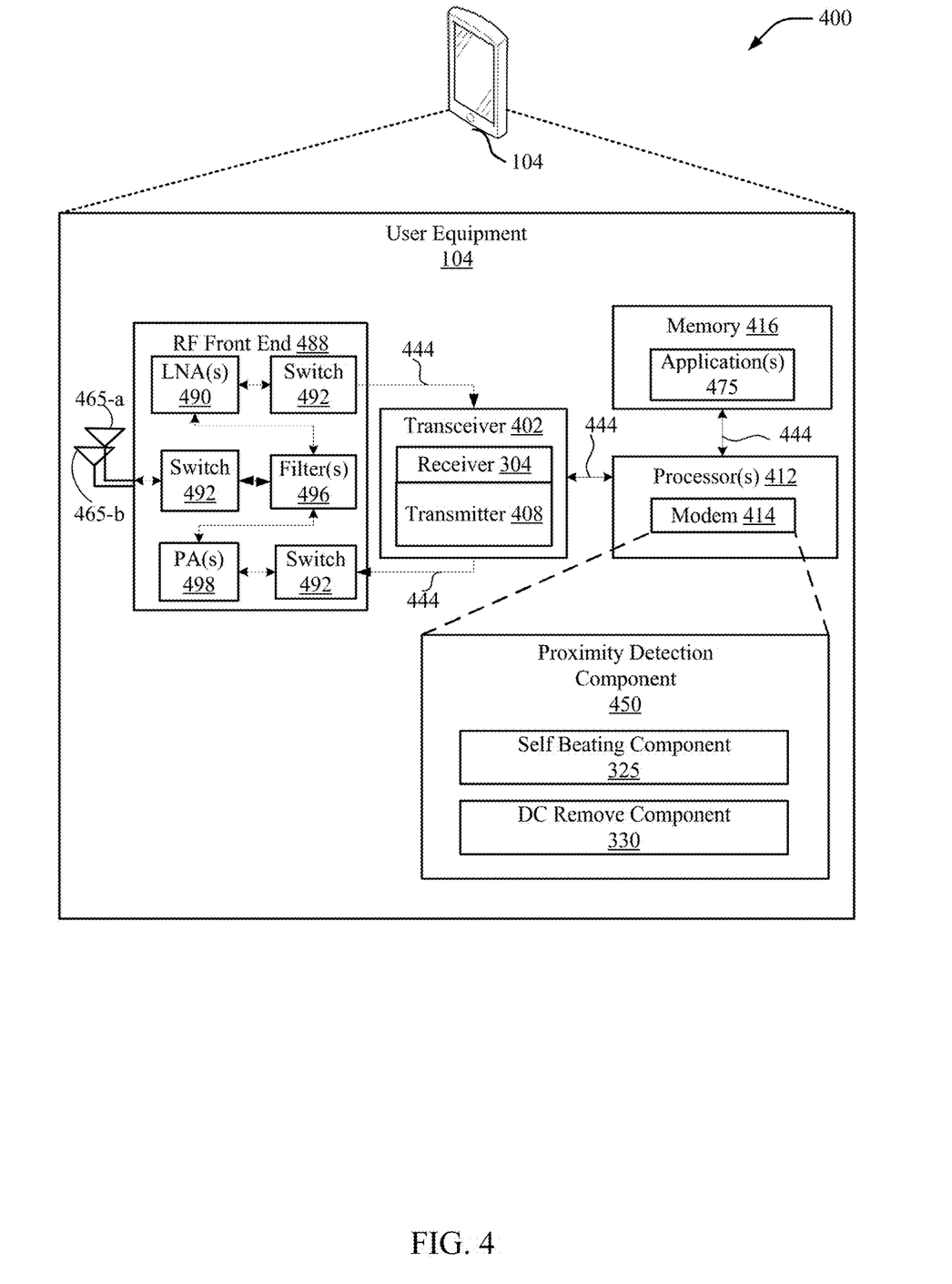
FIG. 4 is a schematic diagram of an example implementation of various components of a UE in accordance with various aspects of the present disclosure.
Figure 5:
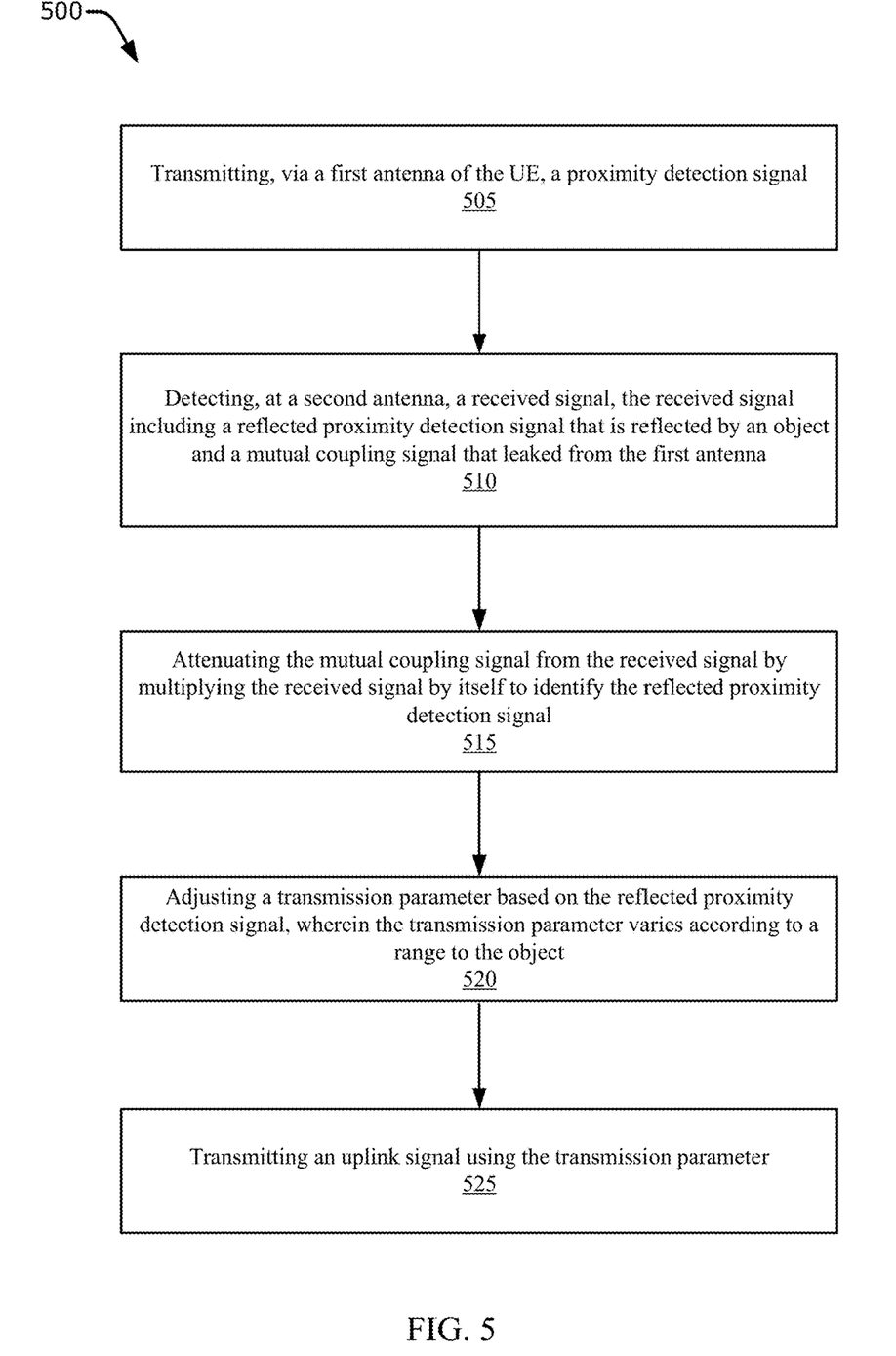
FIG. 5 is a flow diagram of an example of a method of wireless communication implemented by the UE in accordance with aspects of the present disclosure

FIG. 4 illustrates a hardware components and subcomponents of a device that may be a UE 104 for implementing one or more methods (e.g., method 500) described herein in accordance with various aspects of the present disclosure. For example, one example of an implementation of the UE 104 may include a variety of components, some of which have already been described above, but including components such as one or more processors 412, memory 416 and transceiver 402 in communication via one or more buses 444, which may operate in conjunction with the proximity detection component 450 to perform functions described herein related to including one or more methods (e.g., 500) of the present disclosure.

In some examples, the proximity detection component 450 may include a self-beating component 325 for multiplying the down-converted receive signal 336 with the conjugate of the down-converted receive signal 336 to generate a beat signal ($S_{beat}(t)$) 327. The proximity detection component 450 may further include a DC remove component 330 for removing the DC component of the beat signal such that a clean receive signal 324-2 that is absent mutual coupling signal 326 or noise.

The one or more processors 412, modem 414, memory 416, transceiver 402, RF front end 488 and one or more antennas 465, may be configured to support voice and/or data calls (simultaneously or non-simultaneously) in one or more radio access technologies. In an aspect, the one or more processors 412 can include a modem 414 that uses one or more modem processors. The various functions related to beam diversity selection component 450 may be included in modem 414 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 312 and/or modem 414 associated with beam diversity selection component 450 may be performed by transceiver 402.

The memory 416 may be configured to store data used herein and/or local versions of application(s) 475 or beam diversity selection component 450 and/or one or more of its subcomponents being executed by at least one processor 412. The memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, the memory 416 may be a non-transitory computer-readable storage medium that stores one or more computer-executable codes defining beam diversity selection component 450 and/or one or more of its subcomponents, and/or data associated therewith, when the UE 104 is operating at least one processor 412 to execute beam diversity selection component 450 and/or one or more of its subcomponents.

The transceiver 402 may include at least one receiver 302 and at least one transmitter 305. The receiver 406 may include hardware, firmware, and/or software code executable by a processor for receiving data, the code comprising instructions and being stored in a memory (e.g., computer-readable medium). The receiver 302 may be, for example, a radio frequency (RF) receiver. In an aspect, the receiver 302 may receive signals transmitted by at least one UE 104. Additionally, receiver 302 may process such received signals, and also may obtain measurements of the signals, such as, but not limited to, Ec/Io, SNR, RSRP, RSSI, etc. The transmitter 305 may include hardware, firmware, and/or software code executable by a processor for transmitting data, the code comprising instructions and being stored in a memory (e.g., computer-readable medium). A suitable example of the transmitter 305 may including, but is not limited to, an RF transmitter.

Moreover, in an aspect, transmitting device may include the RF front end 488, which may operate in communication with one or more antennas 465 and transceiver 302 for receiving and transmitting radio transmissions, for example, wireless communications transmitted by at least one base station 102 or wireless transmissions transmitted by UE 104. The RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, the LNA 490 can amplify a received signal at a desired output level. In an aspect, each LNA 490 may have a specified minimum and maximum gain values. In an aspect, the RF front end 488 may use one or more switches 492 to select a particular LNA 490 and its specified gain value based on a desired gain value for a particular application.

Further, for example, one or more PA(s) 498 may be used by the RF front end 488 to amplify a signal for an RF output at a desired output power level. In an aspect, each PA 398 may have specified minimum and maximum gain values. In an aspect, the RF front end 488 may use one or more switches 492 to select a particular PA 498 and its specified gain value based on a desired gain value for a particular application.

Also, for example, one or more filters 496 can be used by the RF front end 488 to filter a received signal to obtain an input RF signal. Similarly, in an aspect, for example, a respective filter 496 can be used to filter an output from a respective PA 398 to produce an output signal for transmission. In an aspect, each filter 496 can be connected to a specific LNA 490 and/or PA 498. In an aspect, the RF front end 488 can use one or more switches 492 to select a transmit or receive path using a specified filter 496, LNA 490, and/or PA 498, based on a configuration as specified by the transceiver 402 and/or processor 412.

As such, the transceiver 402 may be configured to transmit and receive wireless signals through one or more antennas 465 via the RF front end 388. In an aspect, the transceiver 402 may be tuned to operate at specified frequencies such that transmitting device can communicate with, for example, one or more base stations 102 or one or more cells associated with one or more base stations 102. In an aspect, for example, the modem 414 can configure the transceiver 402 to operate at a specified frequency and power level based on the configuration of the transmitting device and the communication protocol used by the modem 414.

In an aspect, the modem 414 can be a multiband-multimode modem, which can process digital data and communicate with the transceiver 402 such that the digital data is sent and received using the transceiver 402. In an aspect, the modem 414 can be multiband and be configured to support multiple frequency bands for a specific communications protocol. In an aspect, the modem 414 can be multimode and be configured to support multiple operating networks and communications protocols. In an aspect, the modem 414 can control one or more components of transmitting device (e.g., RF front end 488, transceiver 402) to enable transmission and/or reception of signals from the network based on a specified modem configuration. In an aspect, the modem configuration can be based on the mode of the modem 414 and the frequency band in use. In another aspect, the modem configuration can be based on UE configuration information associated with transmitting device as provided by the network during cell selection and/or cell reselection.

FIG. 5 is a flowchart of an example method 500 for wireless communications in accordance with aspects of the present disclosure. The method 500 may be performed by the UE 104. Although the method 500 is described below with respect to the elements of the UE 104, other components may be used to implement one or more of the steps described herein.

At block 505, the method 500 may include transmitting, via a first antenna of the UE, a proximity detection signal. Aspects of block 505 may be performed by transceiver 402 in conjunction with first antenna 465-a described with reference to FIG. 4. The modem 414 of the UE 104 may generate data corresponding to the proximity detection signal for transmission to the transceiver 402 or the transmitter 408 of the UE 104. The transceiver 402 or the transmitter 408 may convert the data into electrical signals. The RF front end 488 may filter and/or amplify the electrical signals into the electro-magnetic signals. The one or more antennas 465 of the UE 104 may transmit the electro-magnetic signals. Thus, the modem 450, the transceiver 402, the transmitter 408, the RF front end 488, the one or more first antennas 465-a, the one or more processors 412, and/or the UE 104 or one of its subcomponents may define the means for transmitting, via a first antenna of the UE, a proximity detection signal.

At block 510, the method 500 may include detecting, at a second antenna, a received signal. The received signal may include a reflected proximity detection signal that is reflected by an object and a mutual coupling signal that leaked from the first antenna. Aspects of block 510 may be performed by transceiver 402 in conjunction with second antenna 465-b described with reference to FIG. 4. For example, the one or more second antennas 465-b of the UE 104 may receive electro-magnetic signals corresponding to the proximity detection signal at the receiver 406. The RF front end 488 of the UE 104 may filter, amplify, and/or extract electrical signals carried by the electro-magnetic signals. The transceiver 402 or the receiver 406 corresponding may digitize and convert the electrical signals into data and send to the modem 414 of the UE 104. Thus, the modem 414, transceiver 402, receiver 406, the RF front end 488, the one or more second antennas 465, the one or more processors 412, proximity detection component 450 and/or the UE 102 or one of its subcomponents may define the means for detecting, at a second antenna, a received signal.

At block 515, the method 500 may include attenuating the mutual coupling signal from the received signal by multiplying the received signal by itself to identify the reflected proximity detection signal. In some examples, attenuating the mutual coupling signal from the received signal may comprise determining a conjugate of the received signal, and multiplying the received signal with the conjugate of the received signal. Additionally or alternatively, attenuating the mutual coupling signal from the received signal may comprise extracting a delay information associated with the transmission of the proximity detection signal and detection of the received signal, and determining the range to the object from the UE based on the delay information. Aspects of block 515 may be performed by transceiver 402 in conjunction with proximity detection component 450 described with reference to FIG. 4. Thus, with respect to aspects of block 515, the modem 514, the one or more processors 512, the UE 102, the proximity detection component 450 or one of its subcomponents may define the means for attenuating the mutual coupling signal from the received signal by multiplying the received signal by itself to identify the reflected proximity detection signal.

At block 520, the method 500 may include adjusting a transmission parameter based on the reflected proximity detection signal, wherein the transmission parameter varies according to a range to the object. In some examples, the transmission parameter comprises at least one of the following: a power level, a beam steering angle, a frequency, a selected antenna, or a communication protocol. Aspects of block 520 may be performed by transceiver 402 in conjunction with proximity detection component 450 described with reference to FIG. 4. Thus, with respect to aspects of block 520, the transceiver 402, the modem 514, the one or more processors 512, the UE 102, the proximity detection component 450 or one of its subcomponents may define the means for adjusting a transmission parameter based on the reflected proximity detection signal, wherein the transmission parameter varies according to a range to the object.

At block 525, the method may include transmitting an uplink signal using the transmission parameter. Aspects of block 505 may be performed by transceiver 402 in conjunction with first antenna 465-a described with reference to FIG. 4. The modem 414 of the UE 104 may generate data corresponding to the uplink signal for transmission to the transceiver 402 or the transmitter 408 of the UE 104. The transceiver 402 or the transmitter 408 may convert the data into electrical signals. The RF front end 488 may filter and/or amplify the electrical signals into the electro-magnetic signals. The one or more first antennas 465-a of the UE 104 may transmit the electro-magnetic signals over the uplink link. Thus, the modem 450, the transceiver 402, the transmitter 408, the RF front end 488, the one or more first antennas 465-a, the one or more processors 412, and/or the UE 104 or one of its subcomponents may define the means for transmitting an uplink signal using the transmission parameter.

Some Further Example Implementations

An example method for wireless communications implemented by a user equipment (UE), comprising: transmitting, via a first antenna of the UE, a proximity detection signal; detecting, at a second antenna, a received signal, the received signal including a reflected proximity detection signal that is reflected by an object and a mutual coupling signal that leaked from the first antenna; attenuating the mutual coupling signal from the received signal by multiplying the received signal by itself to identify the reflected proximity detection signal; adjusting a transmission parameter based on the reflected proximity detection signal, wherein the transmission parameter varies according to a range to the object; and transmitting an uplink signal using the transmission parameter.

The above example method, wherein attenuating the mutual coupling signal from the received signal by multiplying the received signal by itself comprises: determining a conjugate of the received signal; and multiplying the received signal with the conjugate of the received signal.

Any of the above example methods, wherein attenuating the mutual coupling signal from the received signal by multiplying the received signal by itself comprises: extracting a delay information associated with the transmission of the proximity detection signal and detection of the received signal; and determining the range to the object from the UE based on the delay information.

Any of the above example methods, wherein the transmission parameter comprises at least one of the following: a power level; a beam steering angle; a frequency; a selected antenna; or a communication protocol.

Any of the above example methods, wherein the received signal is an analog signal, and wherein attenuating the mutual coupling signal from the received signal is obtained by feeding the received signal to non-linear device to obtain a by-product of the mutual coupling signal and a desired target signal.

An example UE for wireless communications comprising: a memory configured to store instructions; a processor communicatively coupled with the memory, the processor configured to execute the instructions to: transmit, via a first antenna of the UE, a proximity detection signal; detect, at a second antenna, a received signal, the received signal including a reflected proximity detection signal that is reflected by an object and a mutual coupling signal that leaked from the first antenna; attenuate the mutual coupling signal from the received signal by multiplying the received signal by itself to identify the reflected proximity detection signal; adjust a transmission parameter based on the reflected proximity detection signal, wherein the transmission parameter varies according to a range to the object; and transmit an uplink signal using the transmission parameter.

The above example UE, wherein the instructions to attenuate the mutual coupling signal from the received signal by multiplying the received signal by itself are further executable by the processor to: determine a conjugate of the received signal; and multiply the received signal with the conjugate of the received signal.

Any of the above examples of UE, wherein the instructions to attenuate the mutual coupling signal from the received signal by multiplying the received signal by itself are further executable by the processor to: extract a delay information associated with the transmission of the proximity detection signal and detection of the received signal; and determine the range to the object from the UE based on the delay information.

Any of the above examples of UE, wherein the transmission parameter comprises at least one of the following: a power level; a beam steering angle; a frequency; a selected antenna; or a communication protocol.

Any of the above examples of UE, wherein the received signal is an analog signal, and wherein attenuating the mutual coupling signal from the received signal is obtained by feeding the received signal to non-linear device to obtain a by-product of the mutual coupling signal and a desired target signal.

An example of a non-transitory computer readable medium storing instructions, executable by a processor, for wireless communications, comprising instructions for: transmitting, via a first antenna of the UE, a proximity detection signal; detecting, at a second antenna, a received signal, the received signal including a reflected proximity detection signal that is reflected by an object and a mutual coupling signal that leaked from the first antenna; attenuating the mutual coupling signal from the received signal by multiplying the received signal by itself to identify the reflected proximity detection signal; adjusting a transmission parameter based on the reflected proximity detection signal, wherein the transmission parameter varies according to a range to the object; and transmitting an uplink signal using the transmission parameter.

The above example non-transitory computer readable medium, wherein the instructions for attenuating the mutual coupling signal from the received signal by multiplying the received signal by itself further comprise instructions for: determining a conjugate of the received signal; and multiplying the received signal with the conjugate of the received signal.

Any of the above example computer readable medium, wherein the instructions for attenuating the mutual coupling signal from the received signal by multiplying the received signal by itself further comprise instructions for: extracting a delay information associated with the transmission of the proximity detection signal and detection of the received signal; and determining the range to the object from the UE based on the delay information.

Any of the above example computer readable medium, wherein the transmission parameter comprises at least one of the following: a power level; a beam steering angle; a frequency; a selected antenna; or a communication protocol.

Any of the above example computer readable medium, wherein the received signal is an analog signal, and wherein attenuating the mutual coupling signal from the received signal is obtained by feeding the received signal to non-linear device to obtain a by-product of the mutual coupling signal and a desired target signal.

An example apparatus for wireless communications, comprising: means for transmitting, via a first antenna of the UE, a proximity detection signal; means for detecting, at a second antenna, a received signal, the received signal including a reflected proximity detection signal that is reflected by an object and a mutual coupling signal that leaked from the first antenna; means for attenuating the mutual coupling signal from the received signal by multiplying the received signal by itself to identify the reflected proximity detection signal; means for adjusting a transmission parameter based on the reflected proximity detection signal, wherein the transmission parameter varies according to a range to the object; and means for transmitting an uplink signal using the transmission parameter.

The above example apparatus, wherein the instructions for attenuating the mutual coupling signal from the received signal by multiplying the received signal by itself further comprise instructions for: determining a conjugate of the received signal; and multiplying the received signal with the conjugate of the received signal.

Any of the above example apparatus, wherein the instructions for attenuating the mutual coupling signal from the received signal by multiplying the received signal by itself further comprise instructions for: extracting a delay information associated with the transmission of the proximity detection signal and detection of the received signal; and determining the range to the object from the UE based on the delay information.

Any of the above example apparatus, wherein the transmission parameter comprises at least one of the following: a power level; a beam steering angle; a frequency; a selected antenna; or a communication protocol.

Any of the above example apparatus, wherein the received signal is an analog signal, and wherein attenuating the mutual coupling signal from the received signal is obtained by feeding the received signal to non-linear device to obtain a by-product of the mutual coupling signal and a desired target signal.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications implemented by a user equipment (UE), comprising:
   transmitting, via a first antenna of the UE, a proximity detection signal;
   detecting, at a second antenna, a received signal, the received signal including a reflected proximity detection signal that is reflected by an object and a mutual coupling signal that leaked from the first antenna;
   attenuating the mutual coupling signal from the received signal by multiplying the received signal by itself to identify the reflected proximity detection signal;
   adjusting a transmission parameter based on the reflected proximity detection signal, wherein the transmission parameter varies according to a range to the object; and
   transmitting an uplink signal using the transmission parameter.

2. The method of claim 1, wherein attenuating the mutual coupling signal from the received signal by multiplying the received signal by itself comprises:
   determining a conjugate of the received signal; and
   multiplying the received signal with the conjugate of the received signal.

3. The method of claim 1, wherein attenuating the mutual coupling signal from the received signal by multiplying the received signal by itself comprises:
   extracting a delay information associated with the transmission of the proximity detection signal and detection of the received signal; and
   determining the range to the object from the UE based on the delay information.

4. The method of claim 1, wherein the transmission parameter comprises at least one of the following:
   a power level;
   a beam steering angle;
   a frequency;
   a selected antenna; or
   a communication protocol.

5. The method of claim 1, wherein the received signal is an analog signal, and
   wherein attenuating the mutual coupling signal from the received signal is obtained by feeding the received signal to a non-linear device to obtain a by-product of the mutual coupling signal and a desired target signal.

6. A user equipment (UE) for wireless communications, comprising:
   a memory configured to store instructions; and
   a processor communicatively coupled with the memory, the processor configured to execute the instructions to:
      transmit, via a first antenna of the UE, a proximity detection signal;
      detect, at a second antenna, a received signal, the received signal including a reflected proximity detection signal that is reflected by an object and a mutual coupling signal that leaked from the first antenna;
      attenuate the mutual coupling signal from the received signal by multiplying the received signal by itself to identify the reflected proximity detection signal;
      adjust a transmission parameter based on the reflected proximity detection signal, wherein the transmission parameter varies according to a range to the object; and transmit an uplink signal using the transmission parameter.

7. The UE of claim 6, wherein the instructions to attenuate the mutual coupling signal from the received signal by multiplying the received signal by itself are further executable by the processor to:
   determine a conjugate of the received signal; and
   multiply the received signal with the conjugate of the received signal.

8. The UE of claim 6, wherein the instructions to attenuate the mutual coupling signal from the received signal by multiplying the received signal by itself are further executable by the processor to:
   extract a delay information associated with the transmission of the proximity detection signal and detection of the received signal; and
   determine the range to the object from the UE based on the delay information.

9. The UE of claim 6, wherein the transmission parameter comprises at least one of the following:
   a power level;
   a beam steering angle;
   a frequency;
   a selected antenna; or
   a communication protocol.

10. The UE of claim 6, wherein the received signal is an analog signal, and
   wherein attenuating the mutual coupling signal from the received signal is obtained by feeding the received signal to a non-linear device to obtain a by-product of the mutual coupling signal and a desired target signal.

11. A non-transitory computer readable medium storing instructions, executable by a processor, for wireless communications implemented by a user equipment (UE), comprising instructions for:
   transmitting, via a first antenna of the UE, a proximity detection signal;
   detecting, at a second antenna, a received signal, the received signal including a reflected proximity detection signal that is reflected by an object and a mutual coupling signal that leaked from the first antenna;
   attenuating the mutual coupling signal from the received signal by multiplying the received signal by itself to identify the reflected proximity detection signal;
   adjusting a transmission parameter based on the reflected proximity detection signal, wherein the transmission parameter varies according to a range to the object; and
   transmitting an uplink signal using the transmission parameter.

12. The non-transitory computer readable medium of claim 11, wherein the instructions for attenuating the mutual coupling signal from the received signal by multiplying the received signal by itself further comprise instructions for:
   determining a conjugate of the received signal; and
   multiplying the received signal with the conjugate of the received signal.

13. The non-transitory computer readable medium of claim 11, wherein the instructions for attenuating the mutual coupling signal from the received signal by multiplying the received signal by itself further comprise instructions for:
   extracting a delay information associated with the transmission of the proximity detection signal and detection of the received signal; and
   determining the range to the object from the UE based on the delay information.

14. The non-transitory computer readable medium of claim 11, wherein the transmission parameter comprises at least one of the following:
   a power level;
   a beam steering angle;
   a frequency;
   a selected antenna; or
   a communication protocol.

15. The non-transitory computer readable medium of claim 11, wherein the received signal is an analog signal, and
   wherein attenuating the mutual coupling signal from the received signal is obtained by feeding the received signal to a non-linear device to obtain a by-product of the mutual coupling signal and a desired target signal.

16. A user equipment (UE) for wireless communications, comprising:
   means for transmitting, via a first antenna of the UE, a proximity detection signal;
   means for detecting, at a second antenna, a received signal, the received signal including a reflected proximity detection signal that is reflected by an object and a mutual coupling signal that leaked from the first antenna;
   means for attenuating the mutual coupling signal from the received signal by multiplying the received signal by itself to identify the reflected proximity detection signal;
   means for adjusting a transmission parameter based on the reflected proximity detection signal, wherein the transmission parameter varies according to a range to the object; and
   means for transmitting an uplink signal using the transmission parameter.

17. The UE of claim 16, wherein the means for attenuating the mutual coupling signal from the received signal by multiplying the received signal by itself further comprise:
   means for determining a conjugate of the received signal; and
   means for multiplying the received signal with the conjugate of the received signal.

18. The UE of claim 16, wherein the means for attenuating the mutual coupling signal from the received signal by multiplying the received signal by itself further comprise:
   means for extracting a delay information associated with the transmission of the proximity detection signal and detection of the received signal; and
   means for determining the range to the object from the UE based on the delay information.

19. The UE of claim 16, wherein the transmission parameter comprises at least one of the following:
   a power level;
   a beam steering angle;
   a frequency;
   a selected antenna; or
   a communication protocol.

20. The UE of claim 16, wherein the received signal is an analog signal, and
   wherein attenuating the mutual coupling signal from the received signal is obtained by feeding the received signal to a non-linear device to obtain a by-product of the mutual coupling signal and a desired target signal.

* * * * *